United States Patent [19]
Bjorklund

[11] 3,987,810
[45] Oct. 26, 1976

[54] BURNER SCAVENGING VALVE

[76] Inventor: Curt Arnold Bjorklund, Box 99, Ulricehamn, Sweden

[22] Filed: June 21, 1974

[21] Appl. No.: 481,841

Related U.S. Application Data

[63] Continuation-in-part of Ser. No. 204,623, Dec. 3, 1971, abandoned.

[30] Foreign Application Priority Data
Dec. 7, 1970  Germany............... 7045109[U]
Mar. 17, 1971  Sweden................ 3410/71

[52] U.S. Cl................ 137/107; 431/121; 239/111
[51] Int. Cl.²............. F23D 11/28; F16K 11/00
[58] Field of Search...... 137/107; 431/30, 121; 239/110, 111

[56] References Cited
UNITED STATES PATENTS

| | | |
|---|---|---|
| 2,494,778 | 1/1950 | Plass ....................... 431/121 X |
| 2,685,919 | 8/1954 | Plass et al. ................ 431/121 X |
| 3,339,574 | 9/1967 | Erb et al. .................. 137/107 X |
| 3,358,928 | 12/1967 | Melendy ................... 137/107 X |
| 3,606,905 | 9/1971 | Fehler ...................... 137/107 |

*Primary Examiner*—William R. Cline
*Attorney, Agent, or Firm*—Robert E. Burns; Emmanuel J. Lobato; Bruce L. Adams

[57] ABSTRACT

A valve for incorporation in a fuel line, between a pump and a fuel burner, has a valve chamber and a valve member in the chamber. The valve member normally closes a connection from the pump to the burner, but opens this connection in response to a suitably raised pump discharge pressure. Means are provided whereby, upon the shutting off of such pump discharge pressure, the valve not only closes but momentarily causes fuel to be drawn from the line to the burner, to prevent fuel from dripping out of the burner and from thereby causing smell, spillage or clogging of the burner.

11 Claims, 19 Drawing Figures

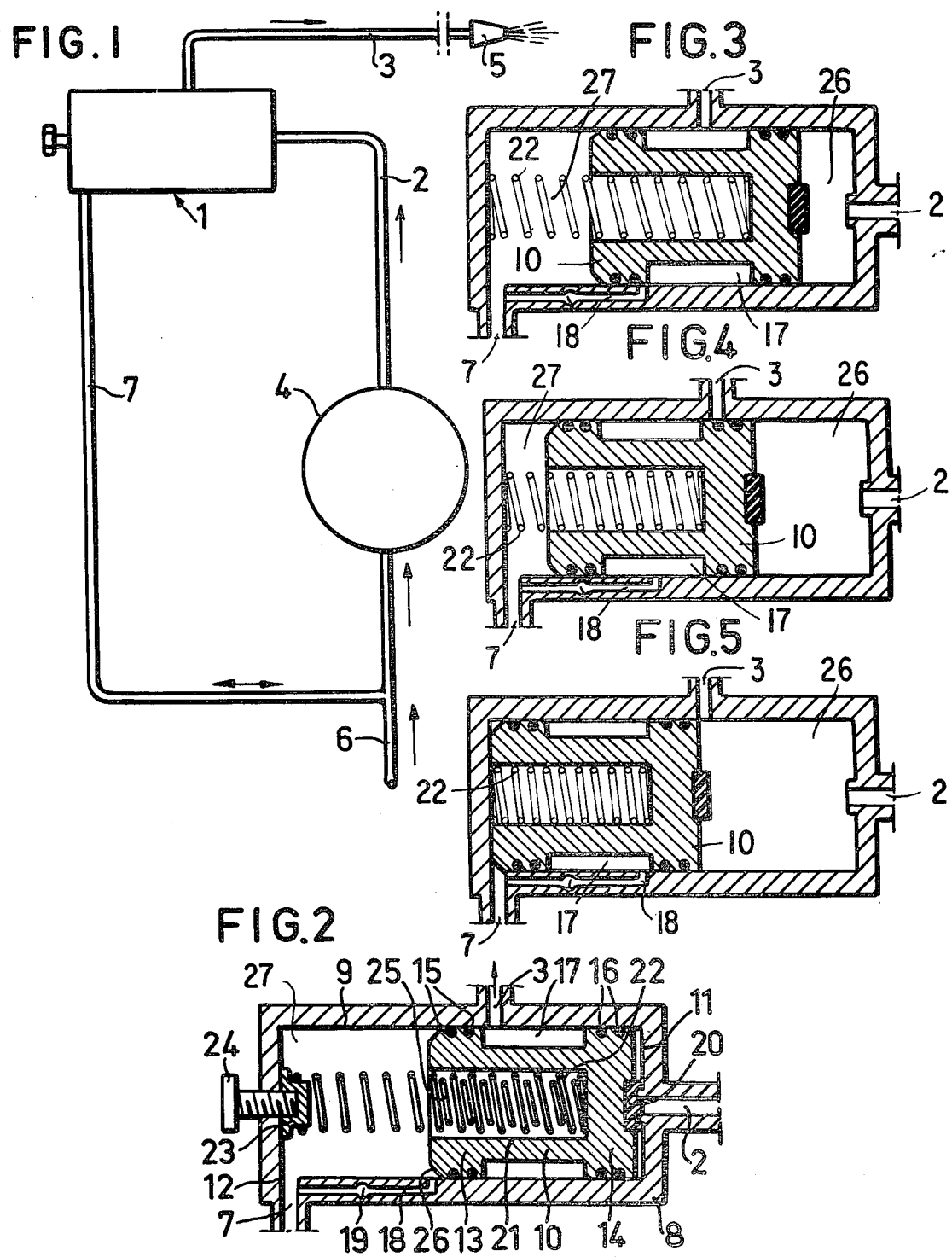

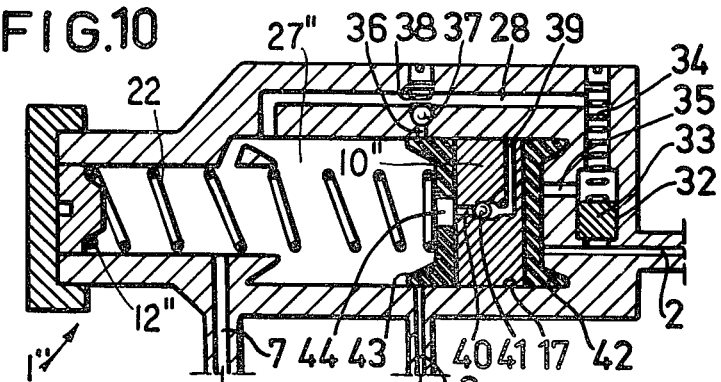
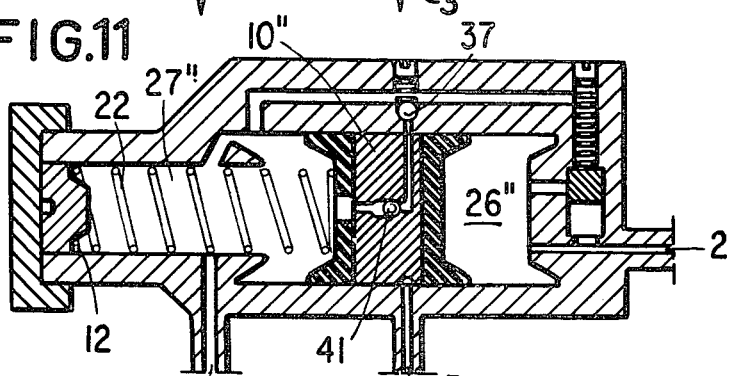
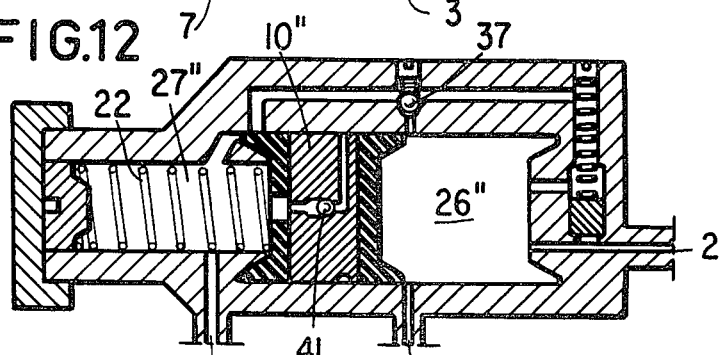
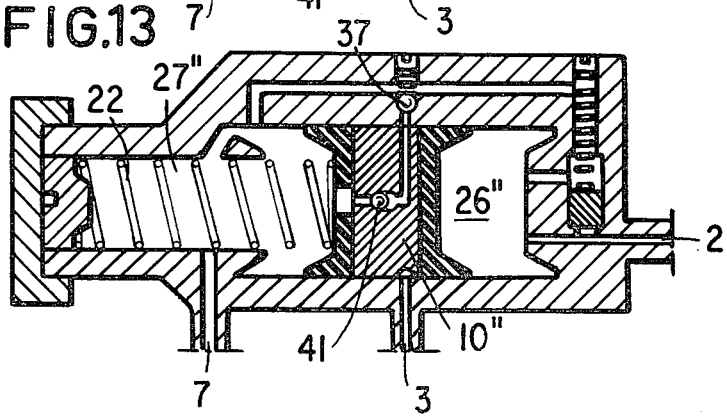

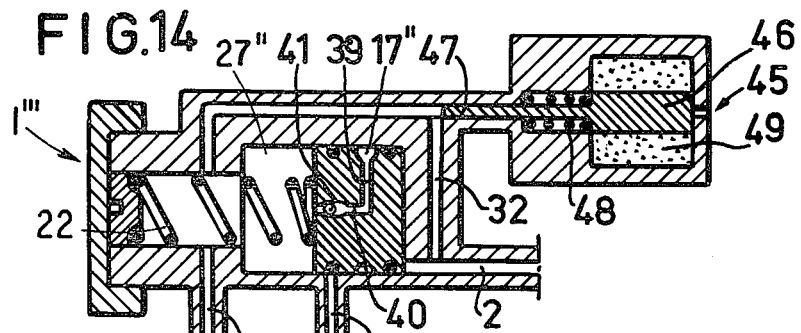
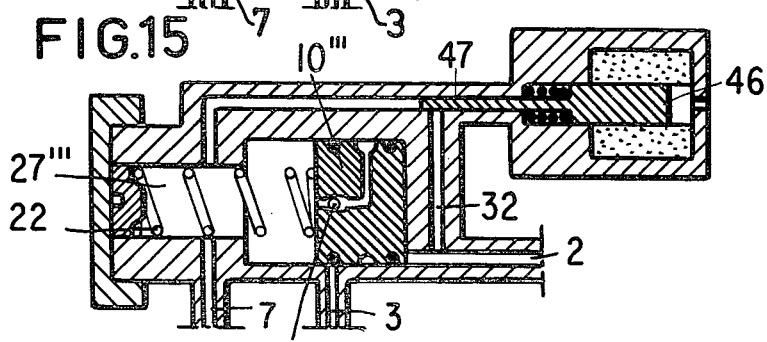
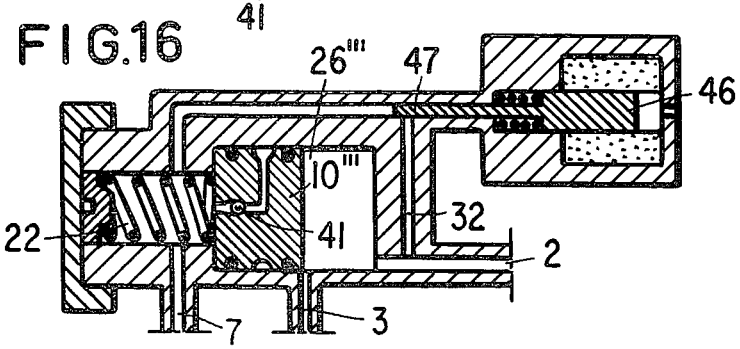
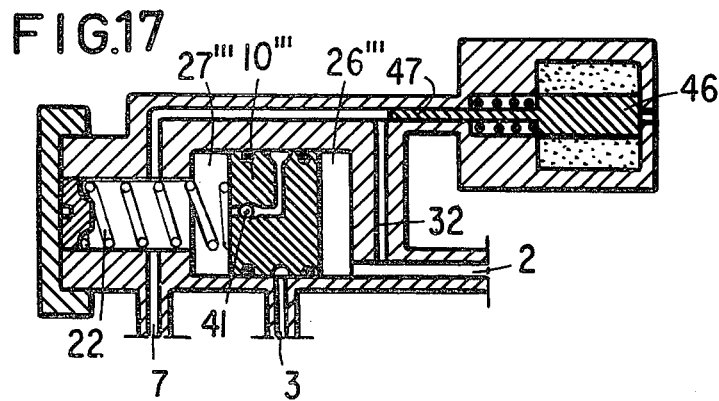

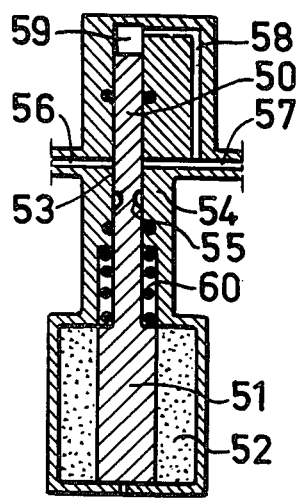
FIG.18
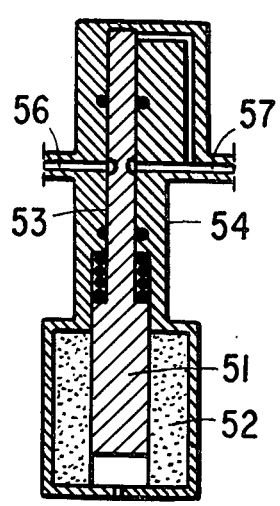
FIG.19
FIG.22

BURNER SCAVENGING VALVE

BACKGROUND OF THE INVENTION

This is a continuation-in-part of the applicant's copending application Ser. No. 204,623 filed Dec. 3, 1971, now abandoned.

A disadvantage of known valves for incorporation into a burner supply line is that they allow oil in the burner supply pipe to drip from the burner, when the supply of oil has been turned off. This dripping causes the formation of soot and the adhesion thereof to the burner parts and parts of the heating boiler. It also creates a smell of oil in the vicinity of the burner. Severe carbon deposit on electrodes of the burner can cause electrical flashovers. As a result of the increased soot formation and deposit, the burner nozzle can bring about poor distribution of the heating flame, whereby the efficiency of the burner is reduced.

These disadvantages have already been noted earlier, and it has been found that sucking back of oil from the burner nozzle is a step on the way to solution of said problems. Accordingly it has been proposed to use the returning of the valve piston or of a special auxiliary piston, moved by the oil pressure to a working position, for sucking back oil from the burner line. However, it is a part of all such proposals, without exception in any way, that the end of the valve chamber which is remote from the pump line, and the entire end surface of the piston situated in that area, are used for producing a vacuum in the burner line which is connected to said chamber end at the piston's return to its initial position. The result of this is that if not the whole burner line then at least a substantial part of the same is emptied of oil and filled with air. This air has again to be pressed out of the apparatus, when the burner starts, and the result will be a rattling, popping, puffing and sooting burner start, which in addition thereto will be relatively slow due to a low start pressure resulting in an insufficient spreading of oil at the nozzle. In the same way the end of combustion will be accompanied by sooting and dripping after, as these conventional valves are not capable to sufficiently quickly and with sufficient suction power cut off the oil supply. The object and the way of working of the previously known valves is limited to remove oil from the burner nozzle and the burner line in a very general way; thereby the disadvantages mentioned above are incurred.

An object of the present invention is to provide a valve which can be incorporated in a supply line to a burner and which obviates or minimizes these troubles.

SUMMARY OF THE INVENTION

The invention provides a valve for incorporation into a fuel line for example between an oil pump and a burner, comprising a valve chamber having a movable valve member, connections to an oil supply and to an outlet to a burner or the like, and means connectable to this outlet for providing a vacuum chamber wherein a pressure lower than that in the outlet prevails during a closing stroke of the movable valve member, so that a certain quantity of fuel is sucked back from the outlet. The term "vacuum chamber," as used herein, includes a chamber, aperture, space, channel, or duct wherein a reduced pressure, particularly a sub-atmospheric pressure can be maintained at a proper time.

BRIEF DESCRIPTION OF THE DRAWINGS

FIG. 1 is a diagram of a burner system including a valve according to the invention;

FIG. 2 is an axial cross-sectional view of a first preferred embodiment of a valve according to the invention, in one position thereof;

FIGS. 3 to 5 schematically illustrate other positions of the same valve in axial cross-sections;

FIGS. 10 – 13 similarly show a third embodiment of the invention;

FIGS. 14 – 17 similarly show a fourth embodiment of the invention, having a magnetically controlled delay; and FIGS. 18 and 19 show a fifth magnet-controlled embodiment of the invention in a position of rest and in a working position respectively;

DESCRIPTION OF THE PREFERRED EMBODIMENTS

Figure 6:
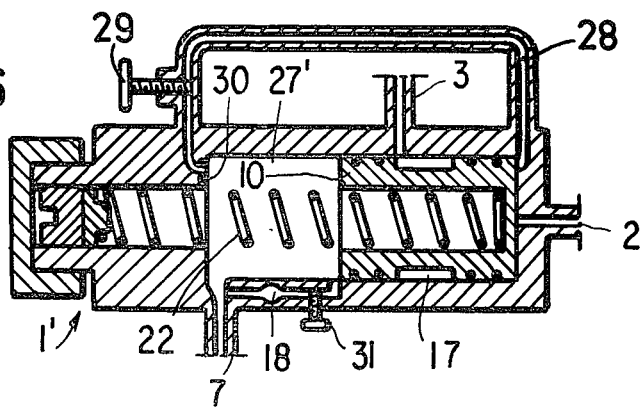
FIGS. 6 – 9 show a second embodiment of the invention, in views corresponding to FIGS. 2 – 5.

In FIG. 1 a valve 1, conforming to the invention, is connected by valve inlet and outlet pipes or lines 2 and 3, respectively, to a pump discharge section of a pump 4 and to a burner 5. The pump 4 has a suction inlet connected by a line 6 to, for example, an oil tank (not shown). The pump has a discharge outlet connected to the valve inlet by the line or pipe 2. Extending between the suction line 6 and the valve 1 is an oil return line 7 which, together with the pump 4 and its discharge line 2, allows a circulation in both directions between valve 1 and pump 4. Modifications are possible; for example the line 7 can extend from the valve 1 directly to said oil tank or the like.

As shown in FIGS. 2 to 5, the housing 8 of valve 1 defines a continuous cylindrical chamber 9 having ends 11,12 shown at right and left, respectively. A piston 10 having first and second (left and right) end portions 13,14 is slideably mounted in chamber 9. The first end portion 13, has a bevelled edge 26 facing the left end 12 of the valve chamber 9. The end portions 13,14 are sealed to the wall of chamber 9 by O-rings 15,16 arranged in the peripheries of these end portions.

Between the two piston end portions 13,14 an annular vacuum chamber 17 is arranged, according to the invention. This chamber communicates, in certain positions of the piston (FIGS. 2, 3) with the burner line 3 and in other positions (FIGS. 4, 5) with an evacuation channel 18; during a transition from the FIG. 3 position to the FIG. 4 position and vice versa, it communicates both with the burner line 3 and with the evacuation channel 18. The channel 18 incorporates an auxiliary valve or ball valve indicated at 19, as will be described hereafter. The channel may be formed, as shown, in the housing 8 surrounding valve chamber 9. The channel 18 discharges into the return line 7 entering the valve at the chamber end 12. As shown in FIG. 2 the channel 18 connects at its other end with chamber 9, obliquely opposite the connection of the burner line 3 to the chamber 9.

The pump line 2 enters at the chamber end 11. Opposite this end the second piston end portion 14, shown at right, is provided with a pad 20, which seals the valve chamber 9 from the pump line 2 when the piston 10 is in its initial position, i.e. when the pump is at rest. The left piston end portion 13 and the piston's central section are provided with a bore 21 receiving one end of a spiral compression spring 22, the other end of this spring embracing an offset-shaped insert 23 at the left end 12 of the chamber 9. An adjusting screw 24, accessible from outside the valve, is introduced into the insert 23. A shorter spring 25 is arranged inside the spring 22 and secured to the right end of bore 21; the left end of this shorter spring is free in the position of FIG. 2.

Operation of the valve will now be described.

When the pump is at rest, the piston 10 is held at right, by spring 22, as shown in FIG. 2. When the pump is started up, pressure is produced in the pump line 2. When a pump discharge pressure of, for example, 2 kg/cm² is exceeded, the counter pressure of the spring 22 is overcome. The piston 10 is then hydraulically pressed in the direction of the chamber end 12, to the left, as viewed in FIGS. 3 – 5, whereby a valve inlet chamber 26 of increasing size is formed between right end 11 and right end portion 14. A left-hand part 27 of valve chamber 9, between end 12 and end portion 13, simultaneously diminishes in volume (FIGS. 3 and 4). Before the piston 10 leaves the described initial position, the burner line 3, as mentioned, was connected to the vacuum chamber 17. Both ends of channel 18 then communicated only with the chamber part 27. After leaving its initial position, the piston end portion 13 initially closes a right-hand end of the channel 18, as shown in FIG. 3. Upon further piston advance (not illustrated) this end of channel 18 is connected to the vacuum chamber 17, to which the burner line 3 is still connected, but no liquid passes through channel 18, which at this time is closed by ball valve 19, which closes towards its chamber and as indicated in the drawing; next, the piston end portion 14 passes and shuts off the burner line 3 (FIG. 4). Shortly thereafter the burner line 3 is connected to the chamber 26 and thus to the pump line 2 (FIG. 5), but first the inner spring 25 contacts the insert 23 and increases the piston counterpressure to, for example, 6 kg/cm². After overcoming this counterpressure the piston 10 is pushed up against the chamber end 12; the burner line 3 is connected to chamber 26; and oil can then flow into the burner through the valve, from the pump, just and only at the decided pressure, as in this example not under 6 kg/cm².

It may be noted here that the pump 4 normally has a pressure regulation valve (not shown). This valve can increase the pump pressure after the above-described valve-opening process to, for example, 7 ats. Alternatively pump check valves (not shown) can be turned off or be put out of action. The total valve-opening process can typically last 6 seconds. During this time the usual burner ventilator or fan normally sets a chimney draft in motion for preliminary blowing, so that a soot-free start of combustion without puffs or backfires can take place.

During the entire piston movement, oil in the chamber part 27 is sucked into the return line 7 and fed to the pump 4 via the line 6. In the positions of FIGS. 4 and 5 this suction force produces, via channel 18, a partial vacuum in the chamber 17 as the valve 19 opens towards the return line 7, as indicated.

Upon switching off of the pump 4, the oil pressure in the valve inlet chamber 26 falls, for example to under 6 kg/cm², and initially both springs 22, 25 act simultaneously and move the valve piston 10 to the right to rapidly close firstly the burner line 3. Since both springs act simultaneously at first, the burner line 3 is closed comparatively quickly and is connected similarly quickly to the vacuum chamber 17.

According to the invention this chamber 17, the channel 18, and the return line 7 connected thereto then suck a certain quantity of oil back out of the burner line 3 and accordingly from the burner nozzle or the like, while the piston 10 moves from the position of FIG. 4 back to that of FIG. 3. This sucking back of oil takes place as the valve 19 opens towards return line 7, in which a vacuum arises due to piston movement towards the resting or initial position which movement is achieved by said springs, respectively spring 22, whereby a vacuum is produced in chamber part 27 and extended to return line 7, and by channel 18 into the vacuum chamber 17. The amount of oil sucked back from said burner nozzle or the like corresponds preferably to substantially the amount of heat expansion of the oil entering said nozzle, which is heated up, at the end of a combustion cycle, usually by the heat of the surrounding combustion chamber. By the sucking back operation, any dripping of oil from the burner 5 is reliably and effectively prevented.

Between the switching off of the pump and the suckback operation as described, the usual burner fan or ventilator (not shown) feeds air for combustion of oil forced out of the burner in the meantime.

Subatmospheric pressure prevails in the vacuum chamber 17 as long as it is connected to channel 18. Finally, the piston end region 13 passes the end of channel 18 in chamber 9, whereupon the pressure in the vacuum chamber 17 is adjusted to atmospheric pressure via burner line 3, during the piston's remaining way to its initial position (FIG. 2). The process of closing valve 1 can typically take about 2.5 seconds.

Figure 7:
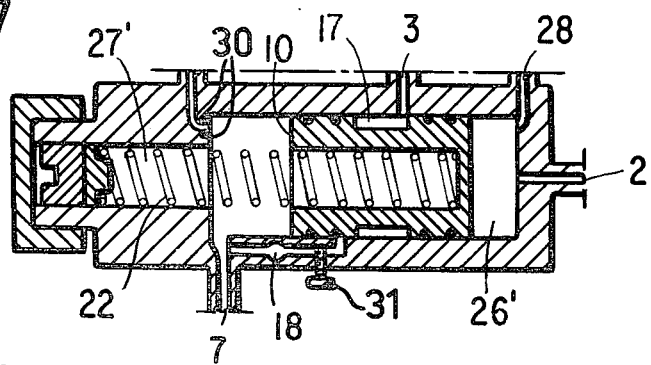
Figure 8:
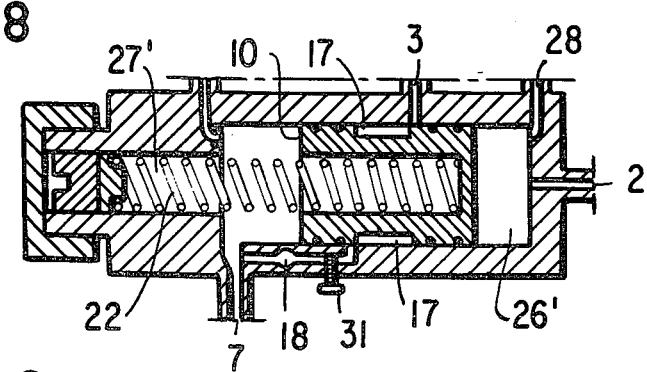
Figure 9:
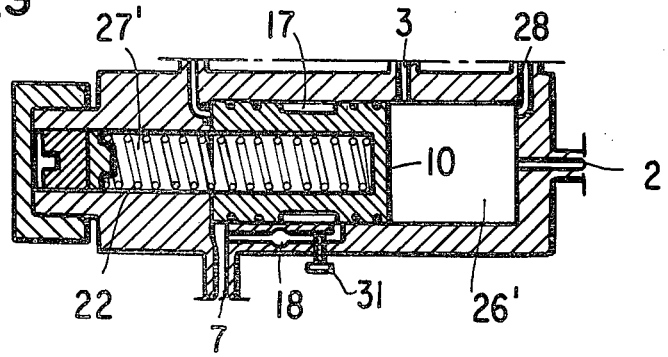

The second embodiment of valve shown in FIGS. 6 to 9 corresponds substantially to the valve of FIGS. 2 to 5, apart from the supplementary arrangement described hereinunder. The same or similar parts of the two valves have been allotted the same reference symbols. The valve 1' (FIGS. 6 to 9) has a bypass 28, between both chamber ends, which is preferably provided with an adjusting screw or the like 29 for regulation of the cross-section of the bypass 28. At least one mouth of bypass 28 can have a pad or packing 30 for sealing purposes. Also the return channel 18 can have an adjustable throttling member 31. This and the screw or the like 29 are optional.

This second embodiment of valve has the following properties.

The bypass 28, properly dimensioned for example by adjusting screw 29, provides balancing of pressures in the valve chambers 26',27' during the various phases of movement of piston 10. Thus the said preliminary blowing of the chimney draft can be effective and adjusted independently of the construction and rating of the pump 4. The piston can at first be spring-loaded with for example 5 kg/cm² and in the working position with 6.8 kg/cm².

The entire valve can have comparatively small dimensions. The rapid piston return in, for example, one second allows shutting-off and suckback to begin approximately after, for example, 0.25 seconds. The return begins with the pump shut-off valve still open, so that the reduction of pressure in the vacuum chamber occurs rapidly. The vacuum chamber works in any valve position, e.g. horizontal or vertical.

Prototype tests with this second embodiment of valve resulted in such rapid shut-off and suck-back that the burner flame disappeared with the burner ventilator still rotating. With optimum adjustment of the quantity regulation means 29, 31 for the quantity of oil that is to be sucked back out of the burner line 3, the burner started directly and perfectly. The quantity of oil corresponds mainly to the expansion, in volume, of the oil remaining in the heated nozzle or the like, as mentioned before. The adjustment can be such as to suck back a quantity of oil as mentioned before, plus a slight margin, so that any dripping is absolutely precluded.

In a further modification of this type of valve both ends of evacuation channel 18 are connected directly to the valve chamber, i.e. the end of channel 18 near the return line 7 can enter parallel to that line into the chamber 9, thereby providing a U-shaped channel 18. In this event a valve 19 for the same appears to be superfluous. The entire evacuation channel 18 is hydrostatically sealed off from the remaining chambers and ducts in the working position of the piston 10. It is preferred, however, to incorporate an adjustable throttling member 31 into the return line 18.

FIGS. 10 to 13 show a third embodiment of a burner shut-off valve 1'' having several auxiliary valves. FIGS. 10 and 12 show the main piston 10'' of this embodiment in both end positions, the position of rest and the working position respectively. FIGS. 11 and 13 show the main piston in an intermediate position, when moving towards and away from the working position respectively.

The pump line 2 is shown as discharging at right, for example through a portion of reduced cross-section into the chamber section 26''. Upstream of the pump line discharge end a bypass channel 32,28 branches off from line 2. In channel part 32 an auxiliary piston 33 is arranged always sealing the bypass channel against the pump line 2. A spring 34 is provided in said part 32 to normally keep piston 33 in a lower position near pump line 2. In said lower or initial position when the auxiliary piston 33 is near the pump line 2, this piston 33 frees a bypass channel part 35, which is connected to the chamber part 26''. The bypass channel 28 discharges into the left-hand chamber part 27'', and is connected, at the center of the valve chamber, to this chamber part by a passage 36, which is normally shut off, on the chamber side, by means of a ball valve 37 loaded by a spring 38. The main piston 10'' is surrounded by an annular groovelike vacuum chamber 17'', which connects, via a radial channel 39, with the piston center, where it connects with an axial channel 40, having a ball valve 41 in a somewhat enlarged part defining a valve chamber extending in axial direction, and leading to the chamber part 27''. A packing 42 or 43 with annular flanges is connected to each piston end. The packing 43 has a center recess 44 coinciding with the channel 40.

This valve works in the following manner:

In the position of rest shown in FIG. 10, packing 42 seals the pump line 2 and the part 35. The auxiliary piston 33 lies near the pump line. The packing 43 closes the burner line 3 and also closes passage 36 which otherwise connects the bypass channel 32,28 with the valve chamber. The ball valve obtains a left-hand position in its chamber.

In FIG. 11 the pump is switched on. Due to corresponding relative dimensioning of springs 22,34 and/or of pump line connections and/or pistons 10'',33, the resulting oil pressure in line 2 raises the auxiliary piston 33, which then cuts off part 35 from 32 and thus the valve chamber part 26'' from the whole bypass channel 28,32. The main piston 10'' is then shifted in the direction of end 12'', and the ball valve 41 moves to the righthand position in its chamber, when vacuum chamber 17'' passes burner line 3, the pressure in which is only atmospheric, meanwhile pressure in chamber part 27'' is somewhat higher due to movement and pressure exerted by the main piston.

After, for example, 6 seconds the piston 10'' reaches its working position, where the packing 43 blocks the left mouth of the bypass channel 28,32, where the ball valve 37 in passage 36 is opened by hydrostatic pressure, and where the burner line 3 is freed, so that oil passes into the latter from pump line 2 via chamber part 26''. Opening of valve 37 causes the piston 33 to return to its initial position, as the pressures acting on it are balanced and the biasing spring 34 forces it down so that it exposes the section 35. Thereupon, also the ball valve 37 closes as the pressures acting on it are balanced. The ball valve 41 remains in its right-hand position.

With the pump switched off the pressure in the chamber section 26'' drops to below, for example 6 kg/cm$^2$, whereupon the pressure of the spring 22 causes the piston 10'' to return, shutting off the chamber section 26'' from the burner line 3 and from the passage 36, while the bypass 28,32 is again connected to the chamber part 27''. As a result of movement of the main piston, a reduction in pressure under atmospheric level occurs in the chamber part 27'' and produces a reduced pressure in the chamber of valve 41, which still obtains its right-hand portion; and whereby a slight quantity of oil is sucked back out of the burner line 3.

In the fourth embodiment of valve ''' (FIGS. 14 to 17) there occurs a delay, controlled from the outside, by means of a magnet 45. This delay determines the duration of the preliminary blowing operation. Other means can replace the magnet. The suction or pressure of the burner fan (not shown) can also bring about the delay.

In the drawings, bypass channel 32 is branched off from the pump line 2 upstream of the end of this line which discharges into the valve chamber. Connected to the channel 32 is a solenoid valve 45, whose core 46 has an extension, in the channel 28 respectively 32, constituting a piston 47 which opens the channel when the solenoid coil 49 is deactivated, being held back by a return spring 48. The main piston 10''' is provided, as before, with channels 39, 40 and ball valve 41 with a small chamber.

In the rest position shown in FIG. 14 the pump line 2 is connected via the unblocked bypass channel 32 to the chamber part 27'''. The pump inlet to the valve chamber and the burner line 3 are blocked by the piston. When the pump 4 starts a time-controlled preliminary blowing operation is started at the burner 5, by conventional means (not shown). Hydrostatic pressure acts on the right end of piston 10''' but the piston return spring 22 produces such a counterpressure that the piston remains in the initial position, while oil flows into the return line 7 via the bypass channel and the chamber part 27.

In FIG. 15 the time delay has expired, causing switch means (not shown) to energize solenoid 49. The solenoid valve 45 then blocks the bypass channel 32; the return spring 48 is compressed. Upon the resulting piston movement towards the working position, the valve 41 still obtains its left-hand position; but it moves to the right, as mentioned in detail before, when vacuum chamber 17''' passes the burner line 3.

In the working position of the piston 10''' in accordance with FIG. 16, oil can flow from the pump line 2 via chamber part 26''' to the burner line 3. The spring 22 then produces by way of example a static mechanical pressure of 2 kg/cm², opposed by a working hydraulic pressure of 5 kg/cm². Thus the piston 10''' rapidly exposes the burner line 3.

Upon switching off the pump the solenoid 49 is deactivated and the return spring 48 opens the bypass channel 28,32 as seen in FIG. 17. The pressure in the chamber part 26''', derived from the residual pump pressure, then is balanced via the bypass channel, with the pressure in chamber part 27''''. By this means and by means of the return spring 22, the piston 10''' rapidly assumes its initial position. As reduced pressure (subatmospheric) develops in the chamber part 27''', the valve 41 moves to the left when the vacuum channel 17''' passes the inlet of the burner line 3, and sucks a small quantity of oil from this line.

It will be seen that in each embodiment, FIGS. 2 to 17, provision is made for connecting the burner line 3 to a fuel return line 7 and thereby to the suction side of pump 4, and to cause the sucking back of oil from line 3, through this line, by the pump suction, aided by suction in the valve chamber caused by the spring-actuated return motion of the valve pistion. This sucking back occurs only while the vacuum chamber passes the connection to the burner line. Advantageously, sucking back of air or other fluid is prevented during the opening stroke of the valve piston, by a check valve or ball valve in a fuel return passage 18 or 40 or by equivalent means such as the use of a U-shaped return channel, as described.

It will also be seen that the ball or equivalent valve member in valve 41 changes position (from right to left and vice versa as shown) by hydrostatic effect of the pressure conditions prevailing at the two ends of channel 40, in the successive positions and operations outlined above. Various check valves are known which are open (eventually only somewhat) when their valve member is at one side, for example by using a fluted valve seat on that side, and which are closed more or less tight when on the other side. Such valves can eventually be used as valves 41. They can also be used, if desired, for valve 19, although they are not shown in those chambers; as indicated above, they can be replaced by other devices, such as a U-shaped channel 18; they may also be omitted.

FIGS. 18, 19 show a fifth embodiment of a valve conforming to the invention which is magnet-controlled from the outside and which is highly simplified, having only one piston 50 connected to a magnet core 51 having a surrounding coil 52. The piston 50 is guided in a bore 53 of a valve housing 54 and is provided with, for example, an annular groove 55 cooperating in the working position with the pump line 56 or burner line 57 crossing the bore 53. From the burner line there branches off an evacuation channel 58, discharging into the bore end remote from the magnet core, for the formation of a vacuum chamber 59.

In FIG. 18 the pump is at rest or has been switched on and a time-set preliminary blowing is occurring. The vacuum chamber is filled with air or oil from the burner line. The magnet core return spring 60 holds the piston back, to block the transition from the pump line to the burner line.

In FIG. 19 the possible preliminary blowing time has ended, the coil is energised and the piston is shifted in the axial direction for the complete or partial filling-up of the vacuum chamber. This reduction in volume allows oil from the evacuation channel to arrive in the burner line. In the working position of the piston the right groove 55 forms the pump-burner line transition. The combustion starts without other than passible preliminary blowing delay.

Upon switching-off of the pump the piston rapidly assumes its position of rest, in order to block the transition between the said lines and by enlarging cavity 59 sucks back a slight quantity of oil out of the burner line.

What we claim as new and desire to secure by Letters Patent is:

1. A valve for controlling a burner fuel line, comprising;
   a valve body having a valve chamber therein, a supply conduit connecting the valve chamber to the delivery side of a pump, a burner conduit having one end connected to the valve chamber and having a delivery end for connection to a burner to deliver fuel to be burned, a movable valve member disposed in the valve chamber for movement from a closing position wherein the valve member closes the supply conduit to a working position wherein the valve member permits fuel to flow from the pump to the burner, the valve member being movable to the working position in response to operation of the pump, means for returning the valve member to the closing position when the pump ceases to operate;
   an evacuation channel for connecting the valve chamber with a suction side of the pump incident to the movement of the valve member from the working position to the closing position;
   a check valve in said evacuation channel disposed for hydrostatically moving in one direction while said valve member moves from said closing position to said working position, and for hydrostatically moving in the other direction during the returning of said valve member; and
   means for defining a vacuum chamber rapidly communicatable with the burner conduit through the evacuation channel and the check valve therein during movement of the valve member, to provide in the vacuum chamber a low pressure effective to suck some fuel back from the delivery end of the burner conduit when the valve member moves from the working position to the closing position.

2. A valve according to claim 1 wherein said vacuum chamber comprises an annular channel around said valve member.

3. A valve according to claim 1 wherein said means for returning said valve member to said initial position comprises a spring bearing against said valve member in said valve chamber.

4. A valve according to claim 3 including means for adjusting the pressure of said spring.

5. A valve according to claim 1 including means defining a bypass channel providing communication from one end of said valve chamber to the other end thereof.

6. A fuel valve comprising;
   a valve body defining a valve chamber having two ends, a supply conduit connecting the valve chamber to a delivery side of a fuel pump, a burner conduit having one end connected to the valve chamber and having another end for connection to a burner, a valve member disposed in the valve chamber for performing, in response to operation of the pump, a working stroke from a closing position wherein the valve member opens the supply conduit, means for effecting a return stroke of the valve member to the closing position when the pump ceases to operate;

a bypass channel extending between the ends of the valve chamber, means defining a passage between said bypass channel and said valve chamber, a first check valve disposed in said passage for selectively enabling and preventing fuel flow from said bypass channel to the valve chamber, depending on the stroke of said valve member;

an evacuation channel for connecting the valve chamber with a suction side of the pump, a second check valve, disposed in the evacuation channel for closing the evacuation channel during the working stroke of the valve member and for opening it during the return stroke thereof; and means for defining a vacuum chamber, rapidly communicatable with the burner conduit through the second check valve incident to the return stroke of the valve member to suck fuel back from the delivery end of the burner conduit.

7. A valve according to claim 6 in which the evacuation channel includes means disposed in said valve member, for defining a passage from said vacuum chamber to one part of said valve chamber, and a pressure operated valve in said passage.

8. A valve according to claim 6 in which the bypass channel includes bypass means between opposite end portions of said valve chamber for balancing pressures in said portions.

9. Apparatus for incorporation into a burner fuel line, comprising;

a valve having a valve chamber; a supply conduit connecting said valve chamber to fuel supply means; a burner conduit connecting said valve chamber to a burner; a valve member disposed in the valve chamber, movable from a closing position wherein the valve member closes the supply conduit to a working position wherein the valve member enables fuel to flow from the supply means to the burner for effecting a return stroke of the valve member to the closing position;

means coacting with the valve member for defining a vacuum chamber communicatable with the burner conduit during movement of the valve member to provide in the vacuum chamber a low pressure effective to suck some fuel back from the burner conduit when the valve member moves from the working position to the closing position;

an evacuation channel for returning fuel sucked back to the fuel supply means; and auxiliary valve means in the evacuation channel for hydrostatically closing the return conduit while the movable valve member moves from the closing position to the working position, and for hydrostatically opening the evacuation channel during a return stroke of the movable valve member, said auxiliary valve means being a ball valve.

10. Apparatus according to claim 9 whereing said auxiliary valve means and at least a part of said evacuation channel are located in a wall of said valve chamber.

11. Apparatus according to claim 9 wherein said auxiliary valve means and at least a part of said evacuation channel are located in said movable valve member.

* * * * *